(No Model.) 3 Sheets—Sheet 1.
J. T. VAN GESTEL.
ELECTRIC MOTOR.
No. 388,512. Patented Aug. 28, 1888.
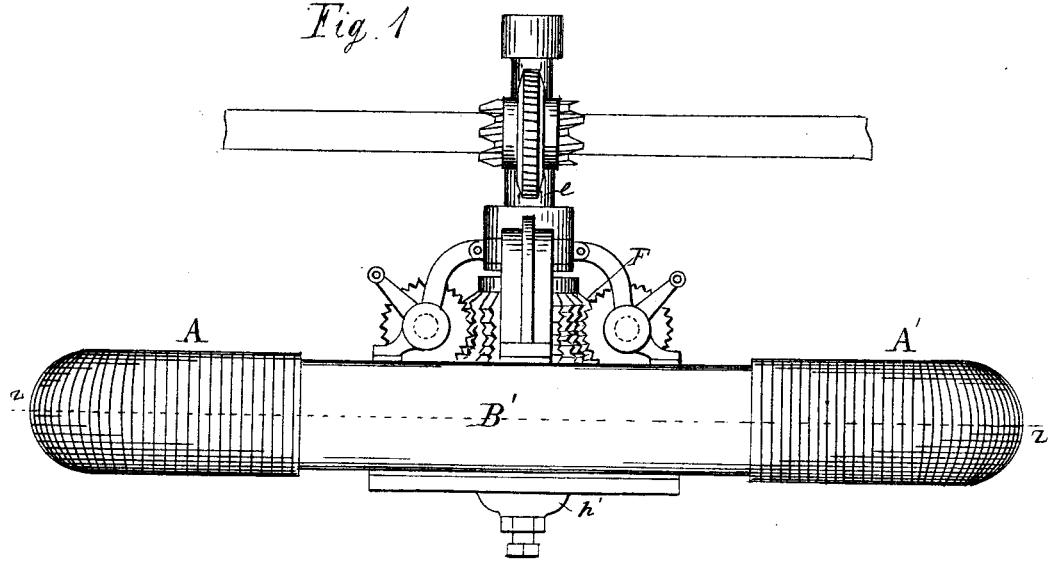
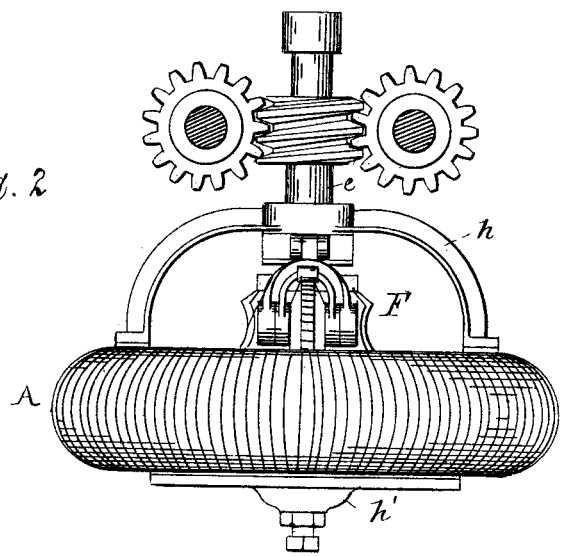
WITNESSES:
INVENTOR.
Jean T. van Gestel.
BY
W. F. Hapgood.
ATTORNEY.

(No Model.) 3 Sheets—Sheet 2.

J. T. VAN GESTEL.
ELECTRIC MOTOR.

No. 388,512. Patented Aug. 28. 1888.

WITNESSES:
A. B. Ripinsky
Daniel Murray

INVENTOR,
Jean T. van Gestel,
BY
W. F. Hapgood
ATTORNEY.

(No Model.) 3 Sheets—Sheet 3.

J. T. VAN GESTEL.
ELECTRIC MOTOR.

No. 388,512. Patented Aug. 28, 1888.

WITNESSES:

INVENTOR,
Jean T. van Gestel,
BY W. F. Hapgood,
ATTORNEY

UNITED STATES PATENT OFFICE.

JEAN T. VAN GESTEL, OF NEW YORK, N. Y., ASSIGNOR TO THE VAN GESTEL MANUFACTURING COMPANY, OF NEW YORK.

ELECTRIC MOTOR.

SPECIFICATION forming part of Letters Patent No. 388,512, dated August 28, 1888.

Application filed September 10, 1887. Serial No. 249,317. (No model.)

*To all whom it may concern:*

Be it known that I, JEAN T. VAN GESTEL, a subject of the King of The Netherlands, residing in New York, in the county and State of New York, have invented a new and useful Improvement in Electric Motors, of which the following is a specification.

My invention relates to a motor adapted to be used for propelling tram-cars or in similar situations where little room is available, and has for its objects the production of a machine which shall occupy but little space in a perpendicular direction, and which will more completely utilize the full power of the electricity supplied to it than is usual with machines of this class. I attain these objects by the mechanism illustrated in the accompanying drawings, in which—

Figure 3:
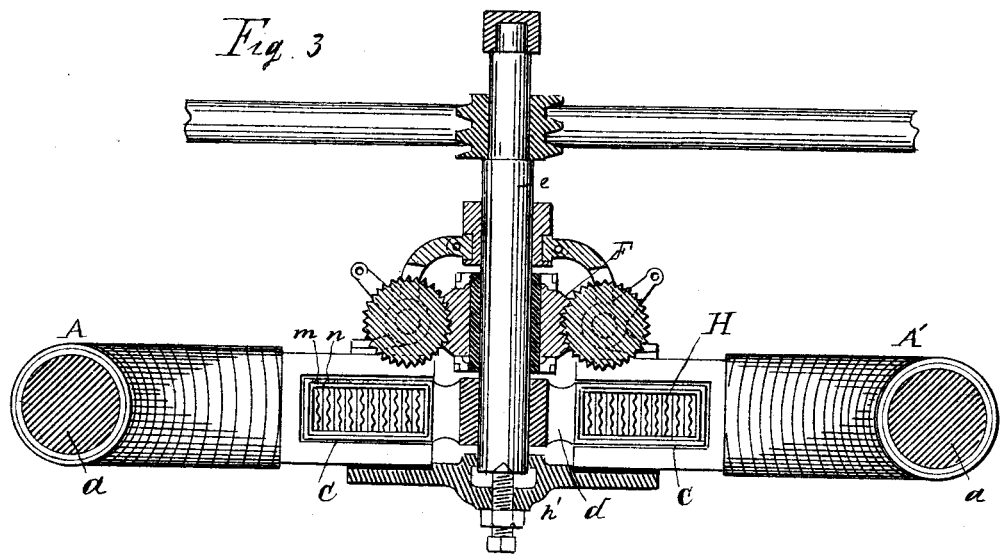
Figure 4:
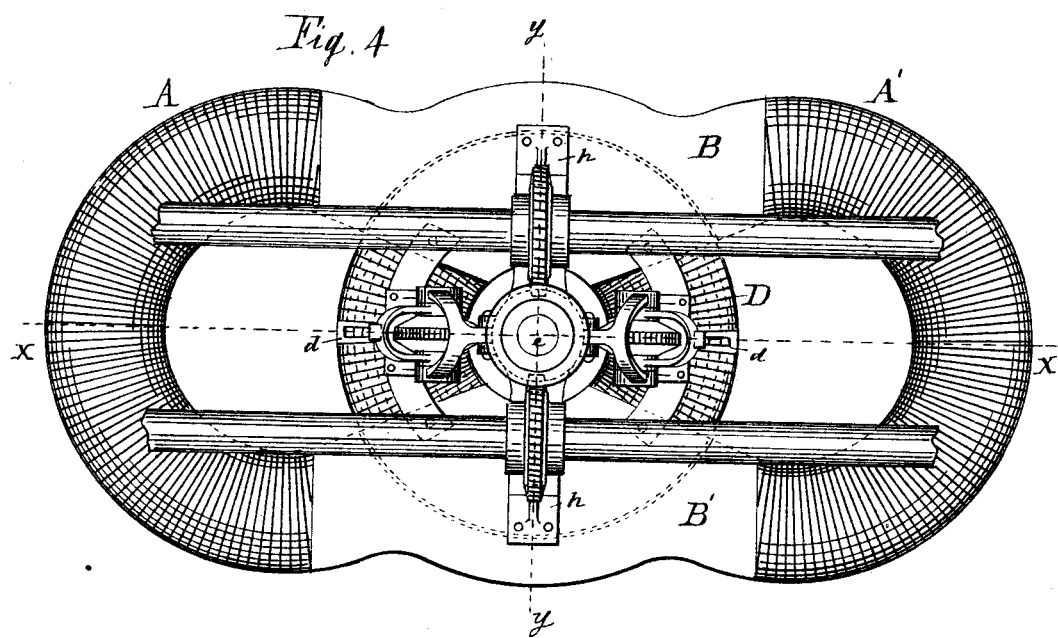
Figure 5:
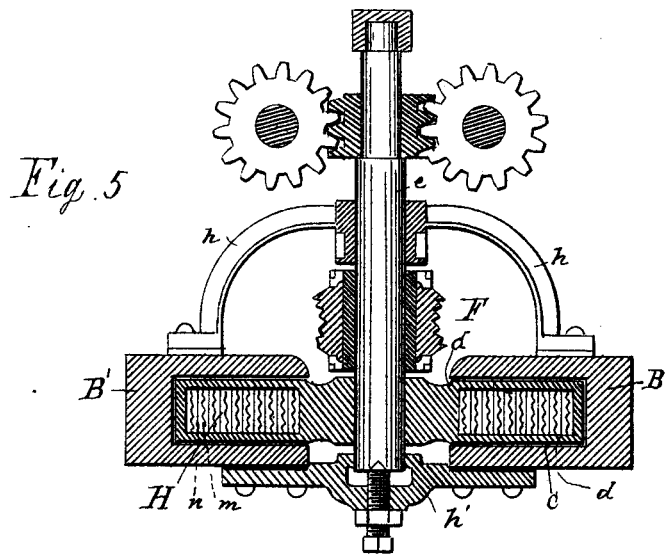
Figure 6:
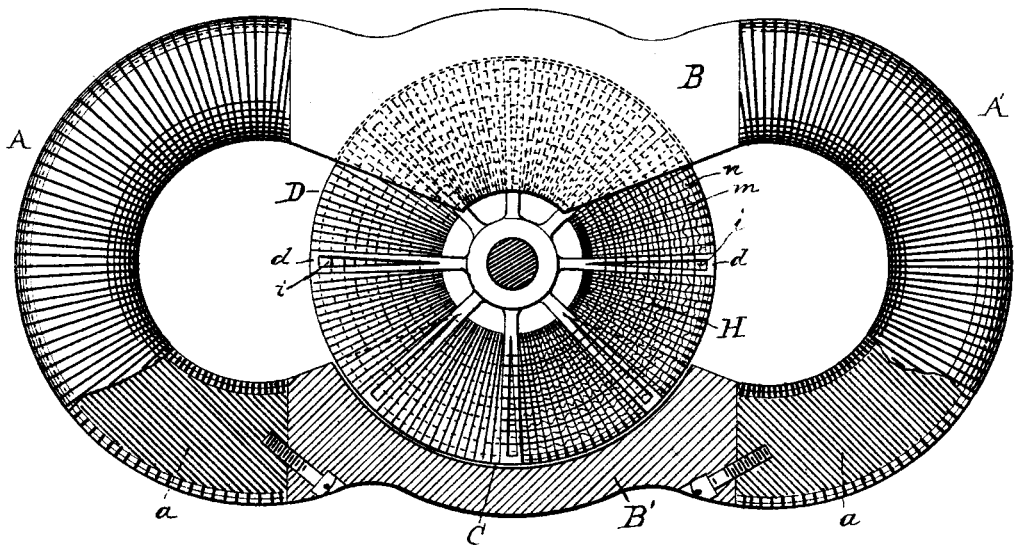

Figure 1 is a side elevation of the machine. Fig. 2 is an end view. Fig. 3 is a longitudinal section on the line $x\ x$ of Fig. 4, which is a plan view of the machine. Fig. 5 is a transverse section on the line $y\ y$, Fig. 4; and Fig. 6 is a view partly in section on line $z\ z$ in Fig. 1.

Similar letters refer to similar parts in all the figures.

A double field-magnet, A A′, is employed, composed of two round bars of wrought-iron, $a\ a$, bent in a semicircular form and wound with the exciting-coils of wire in the ordinary manner. These two magnets are joined to two cast-iron pole-pieces, B B′, thus giving but two magnetic poles. These pole-pieces are of such a form as to substantially continue the curves of the two magnets A A′, as shown in Figs. 4 and 6, and thus the lines of the magnetic currents are not interrupted or diverted from their natural curves. Deep semicircular channels $c\ c$ are cut in the interior faces of these pole-pieces, as shown in Figs. 3, 5, and 6, which overlap and embrace the armature D, presenting surfaces to three of its sides. The armature D is of the disk form, and is mounted upon a shaft, $e$, which is supported by frame-work $h\ h'$, attached to the pole-pieces B B′, and is constructed as follows: Upon a hub of brass or other non-magnetic metal are fixed a number of radial arms, $d\ d$, which in plan are of wedge form, as shown in Fig. 6, the base of the wedge being at the outer ends of the arms, and a similarly-shaped opening, $i$, is cut through each one in order to admit air freely to the interior of the armature. Through the end of each arm transversely is cut a quadrilateral opening (shown in Figs. 3 and 5) to receive the core H of the armature. This core is composed of two strips, $m$ and $n$, of iron, which are wound together spirally upon the arms $d\ d$ through the openings in the ends of the arms. One of these strips, $m$, is corrugated longitudinally, and the other, $n$, is corrugated transversely, and when the two are placed together and wound upon the arms $d\ d$ the two corrugations form spaces which admit air freely to every portion of the core which they form. The arms $d\ d$ divide off segments of the core H, upon which the different coils of the armature are wound, and these coils are connected with a commutator, F, of any suitable form.

The armature constructed as above is not liable to heat, on account of the free circulation of air which it permits, and this, combined with the field-magnets so formed as to offer little interruption to the magnetic circuit, while having ample pole-pieces and embracing three sides of the armature, constitutes in a compact form a very powerful and economical motor.

What I claim, and desire to secure by Letters Patent, is—

1. In an electric motor, the combination of a double field-magnet composed of two semicircular electro-magnets, A A′, whose like poles are respectively joined to two pole-pieces, B B′, formed to substantially continue the lines of the magnetic circuit, and having semicircular channels $c\ c$ in their faces, which admit and embrace the disk-armature, with the armature D, having hollow radial arms $d\ d$, and a core composed of two thin bands of iron corrugated in opposite directions, as herein described.

2. In an electric motor, the combination of the double electro-magnets A A′ and pole-pieces B B′ with the disk-armature D, rotating in the same plane as the field-magnet, and having a core composed of two strips of thin iron, $m$ and $n$, one corrugated longitudinally and the other transversely, which are coiled together spirally upon the hollow arms $d\ d$, as set forth.

JEAN T. VAN GESTEL.

Witnesses:
E. H. AYRE,
I. B. RIPINSKY.